(12) United States Patent
Karame et al.

(10) Patent No.: US 10,797,877 B2
(45) Date of Patent: Oct. 6, 2020

(54) METHOD AND SYSTEM FOR BYZANTINE FAULT-TOLERANCE REPLICATING OF DATA

(71) Applicant: NEC Laboratories Europe GmbH, Heidelberg (DE)

(72) Inventors: Ghassan Karame, Heidelberg (DE); Wenting Li, Heidelberg (DE); Jian Liu, Helsinki (FI); Nadarajah Asokan, Espoo (FI)

(73) Assignee: NEC CORPORATION, Tokyo (JP)

( * ) Notice: Subject to any disclaimer, the term of this patent is extended or adjusted under 35 U.S.C. 154(b) by 157 days.

(21) Appl. No.: 16/081,429

(22) PCT Filed: Nov. 25, 2016

(86) PCT No.: PCT/EP2016/078883
§ 371 (c)(1),
(2) Date: Aug. 31, 2018

(87) PCT Pub. No.: WO2018/095540
PCT Pub. Date: May 31, 2018

(65) Prior Publication Data
US 2019/0386829 A1    Dec. 19, 2019

(51) Int. Cl.
*H04L 9/32* (2006.01)
*G06F 11/14* (2006.01)
(Continued)

(52) U.S. Cl.
CPC .......... *H04L 9/321* (2013.01); *G06F 11/1451* (2013.01); *G06F 11/1469* (2013.01);
(Continued)

(58) Field of Classification Search
CPC ............. G06F 11/2097; G06F 11/2094; G06F 11/1469; G06F 2201/82; G06F 11/1451;
(Continued)

(56) References Cited

U.S. PATENT DOCUMENTS

| | | | |
|---|---|---|---|
| 10,049,017 B2* | 8/2018 | Karame | G06F 11/2071 |
| 2012/0150802 A1* | 6/2012 | Popov | G06F 11/1487 707/635 |
| 2018/0157558 A1* | 6/2018 | Karame | G06F 11/2058 |

OTHER PUBLICATIONS

Giuliana Santos Veronese, et al., "Efficient Byzantine Fault-Tolerance", IEEE Transactions on Computers, vol. 62, No. 1, Jan. 2013, pp. 16-30, XP011475447.

(Continued)

*Primary Examiner* — Baotran N To
(74) *Attorney, Agent, or Firm* — Leydig, Voit & Mayer, Ltd.

(57) ABSTRACT

A method for byzantine fault-tolerance replicating of data on a plurality of n servers includes performing a preprocessing procedure. The n servers include one primary node (PN) and n−1 backup nodes (BN), wherein f servers may arbitrarily fail, and wherein all n servers have a trusted computing entity (TCE). The preprocessing procedure is performed by the TCE of the PN and includes computing a random secret value for a unique, monotonic, sequential counter (UMSC) to be assigned with a request message for requesting an operation to be performed, computing a commitment for the random secret value and the UMSC, and splitting the random secret value into a plurality of shares. The preprocessing procedure further includes computing a server-specific authenticated encryption of each share, and providing the computed server-specific shares and the computed commitment to the respective servers.

15 Claims, 3 Drawing Sheets

(51) Int. Cl.
*H04L 9/08* (2006.01)
*H04L 9/30* (2006.01)

(52) U.S. Cl.
CPC .......... *H04L 9/0869* (2013.01); *H04L 9/3073* (2013.01); *H04L 9/3247* (2013.01); *G06F 2201/82* (2013.01)

(58) Field of Classification Search
CPC ..... H04L 9/3247; H04L 9/0869; H04L 9/321; H04L 9/3073
See application file for complete search history.

(56) References Cited

OTHER PUBLICATIONS

Eleftherios Kokoris-Kogias, et al., "Enhancing Bitcoin Security and Performance with Strong Consistency via Collective Signing", arXiv:1602.06997v1 [cs-CR], Feb. 22, 2016, pp. 1-17, XP080685316.

Tobias Distler, et al., "Resource-Efficient Byzantine Fault Tolerance", IEEE Transactions on Computers, vol. 65, No. 9, Sep. 2016, pp. 2807-2819, XP011618556.

Ewa Syta, et al., "Keeping Authorities "Honest or Bust" with Decentralized Witness Cosigning", 2016 IEEE Symposium on Security and Privacy, pp. 526-545, XP032945718.

\* cited by examiner

METHOD AND SYSTEM FOR BYZANTINE FAULT-TOLERANCE REPLICATING OF DATA

CROSS REFERENCE TO RELATED APPLICATIONS

This application is a U.S. National Stage Application under 35 U.S.C. § 371 of International Application No. PCT/EP2016/078883 filed on Nov. 25, 2016. The International Application was published in English on May 31, 2018 as WO 2018/095540 A1 under PCT Article 21(2).

FIELD

The present invention relates to a method for byzantine fault-tolerance replicating of data on a plurality of n servers by a client, said n servers comprising one primary node, 'PN', and n−1 backup nodes, 'BN', wherein f servers may arbitrarily fail and wherein all n servers having a trusted computing entity, 'TCE'.

The present invention further relates to a system byzantine fault-tolerance replicating of data on a plurality of n servers by a client, said n servers comprising one primary node, 'PN' and n−1 backup nodes, 'BN', wherein f servers may arbitrarily fail, and wherein all n servers having a trusted computing entity, 'TCE'.

The present invention further relates to a non-transitory computer readable medium storing a program causing a computer to execute a method for byzantine fault-tolerance replicating of data on a plurality of n servers by a client, said n servers comprising one primary node, 'PN' and n−1 backup nodes, 'BN', wherein f servers may arbitrarily fail, and wherein all n servers having a trusted computing entity, 'TCE'.

BACKGROUND

A so-called byzantine fault was introduced to capture arbitrary behavior of a faulty process e.g. as disclosed in the non-patent-literature of L. Lamport, R. Shostak, and M. Pease, "The byzantine generals problem," ACM Trans. Program. Lang. Syst., vol. 4, no. 3, pp. 382-401, July 1982. For instance, an adversary can control the behavior of the compromised processes in order to cause the rest of the system to act in an erroneous way. Asynchrony is a non-assumption about timing properties, i.e., there is no assumption about the processing speeds and transmission delays. This (non-) assumption is realistic when the adversary fully controls the network: Attackers can often violate some timing properties by launching denial-of-service attacks against processes or communications. For instance, the attacker might delay the communication of a process for an interval, breaking some assumption about the timeliness of the system.

This system model—Byzantine faults and asynchrony—leads to an impossibility result, which says that consensus can not be deterministically solved in an asynchronous system if a single process can crash (often called the Fischer-Lynch-Paterson, FLP, result as described in the non-patent literature of T. C. Group, "Tpm main, part 1 design principles. specification version 1.2, revision 103." 2007. The reason for the impossibility is that in an asynchronous system it is impossible to differentiate a crashed process from another that is simply slow or connected by a slow network link.

With the widespread deployment of cryptocurrencies like Bitcoin, one of their supporting technologies, blockchain, becomes increasingly popular. It is a distributed consensus protocol that serves as a public ledger for cryptocurrency transactions. One of the problems is that their consensus protocols provide only probabilistic consistency guarantees.

In order to build a distributed consensus systems that provide strong consistency guarantees, financial institutions have begun to investigate the traditional Byzantine fault tolerant (BFT) protocols, which enable n servers to collectively act as a single machine even if f of them misbehave or malfunction in arbitrary ("Byzantine") ways. However, practitioners usually hesitate to deploy such BFT protocols because of two reasons. The first reason is their poor scalability in terms of number of servers due to their intensive network communication which often involves as many as $O(n^2)$ messages for each request as for example disclosed in the non-patent literature of B.-G. Chun, P. Maniatis, S. Shenker, and J. Kubiatowicz, "Attested append only memory: Making adversaries stick to their word," in Proceedings of Twenty-first ACM SIGOPS Symposium on Operating Systems Principles, ser. SOSP '07. New York, N.Y., USA: ACM, 2007, pp. 189-204, available online: http://doi.acm.org/10.1145/1294261.1294280. The second reason is their high resource consumption, which requires $n \geq 3f+1$ servers to tolerate up to f faults as for example disclosed in the non-patent literature of M. Castro and B. Liskov, "Practical byzantine fault tolerance," in Proceedings of the Third Symposium on Operating Systems Design and Implementation, ser. OSDI '99. Berkeley, Calif., USA: USENIX Association, 1999, pp. 173-186, available online http://dl.acm.org/citation.cfm?id=296806.296824.

Another conventional BFT-protocol called practical Byzantine fault tolerance (PBFT) for state machine replication services is shown in the non-patent literature of B.-G. Chun, P. Maniatis, S. Shenker, and J. Kubiatowicz, "Attested append only memory: Making adversaries stick to their word," in Proceedings of Twenty-first ACM SIGOPS Symposium on Operating Systems Principles, ser. SOSP '07. New York, N.Y., USA: ACM, 2007, pp. 189-204, available online: http://doi.acm.org/1 0.1 145/1294261. 1294280. Such a service is modeled as a state machine that is replicated across different servers in a distributed system. Each server maintains the service state and implements the service operations. Clients send requests to execute operations to the servers and PBFT ensures that all non-faulty servers execute the same operations in the same order.

Recently, trusted hardware has become widely available on commodity computing platforms. Trusted execution environments (TEES) are already pervasive on mobile platforms, as e.g. disclosed in the non-patent-literature of J. Ekberg, K. Kostiainen, and N. Asokan, "The untapped potential of trusted execution environments on mobile devices," IEEE Security & Privacy, vol. 12, no. 4, pp. 29-37, 2014, and newer TEEs e.g. disclosed in the non-patent-literature of F. McKeen, I. Alexandrovich, A. Berenzon, C. V. Rozas, H. Shafi, V. Shanbhogue, and U. R. Savagaonkar, "Innovative instructions and software model for isolated execution," in HASP, 2013, pp. 10:1-10:1 or Intel, "Software Guard Extensions Programming Reference," 2013 are being deployed on PCs and servers. A TEE provides confidentiality and integrity protection for the data inside its memory, and ensures that no one can interfere with its operation.

Trusted hardware has also been used to reduce the number of servers and/or communication phases for BFT protocols e.g. disclosed in the non-patent-literature of:

M. Correia, N. F. Neves, and P. Verissimo, "How to tolerate half less one byzantine nodes in practical distributed systems," in *Reliable Distributed Systems*, 2004. Proceedings of the 23rd IEEE International Symposium on, October 2004, pp. 174-183, G. S. Veronese, M. Correia, A. N. Bessani, L. C. Lung, and P. Verissimo, "Efficient byzantine fault-tolerance," *IEEE Transactions on Computers*, vol. 62, no. 1, pp. 16-30, January 2013, G. S. Veronese, M. Correia, A. N. Bessani, and L. C. Lung, "Ebawa: Efficient byzantine agreement for wide-area networks," in *High-Assurance Systems Engineering (HASE)*. 2010 IEEE 12$^{th}$ International Symposium on. November 2010, pp. 10-19, R. Kapitza, J. Behl, C. Cachin, T. Distler, S. Kuhnle, S. V. Mohammadi, W. Schröder-Preikschat, and K. Stengel, "Cheapbft: Resource-efficient byzantine fault tolerance," in *Proceedings of the 7$^{th}$ ACM European Conference on Computer Systems*, ser. EuroSys '12. New York, N.Y., USA: ACM, 2012, pp. 295-308, B.-G. Chun, P. Maniatis, S. Shenker, and J. Kubiatowicz, "Attested append-only memory: Making adversaries stick to their word," in *Proceedings of Twenty-first ACM SIGOPS Symposium on Operating Systems Principles*, ser. SOSP '07. New York, N.Y., USA: ACM, 2007, pp. 189-204, and D. Levin, J. R. Douceur, J. R. Lorch, and T. Moscibroda, "Trinc: Small trusted hardware for large distributed systems," in *Proceedings of the 6th USENIX Symposium on Networked Systems Design and Implementation*, ser. NSDI'09. Berkeley, Calif., USA: USENIX Association, 2009, pp. 1-14.

For example, MinBFT, e.g. disclosed in the non-patent-literature of G. S. Veronese, M. Correia, A. N. Bessani, L. C. Lung, and P. Verissimo, "Efficient byzantine fault-tolerance," *IEEE Transactions on Computers*, vol. 62, no. 1, pp. 16-30, January 2013 uses a trusted monotonic counter to build a Unique Sequential Identifier Generator (USIG) service to prevent a faulty server from making conflicting statements, which is called equivocation. As a result, the number of required servers is reduced from 3f+1 to 2f+1 and the number of communication phases is reduced from 3 to 2. In more detail a trusted monotonic counter is used to build a Unique Sequential Identifier Generator (USIG), which is a local service that exists in every server. It assigns each requested message M a unique identifier (UI), which is a cryptographic signature of M together with a unique, monotonic and sequential counter c. These three properties imply that the USIG (1) will never assign the same identifier to two different messages (uniqueness), (2) will never assign an identifier that is lower than a previous one (monotonicity), and (3) will never assign an identifier that is not the successor of the previous one (sequentiality). These properties are guaranteed even if the server is compromised, and the service is implemented inside a trusted execution environment.

For instance CheapBFT as e.g. disclosed in the non-patent-literature of R. Kapitza, J. Behl, C. Cachin, T. Distler, S. Kuhnle, S. V. Mohammadi, W. Schröder-Preikschat, and K. Stengel, "Cheapbft: Resource-efficient byzantine fault tolerance," in *Proceedings of the 7$^{th}$ ACM European Conference on Computer Systems*, ser. EuroSys '12. New York, N.Y., USA: ACM, 2012, pp. 295-308 further improves the performance by running a composite agreement protocol. In the absence of faults, it requires that only f+1 servers actively agree on and execute client requests. The other f passive servers just modify their states by processing state updates provided by the active servers. In case of suspected faulty behavior, CheapBFT triggers a transition protocol to activate the passive servers, and then switch to MinBFT.

However, MinBFT uses a Trusted Platform Module (TPM) e.g. as disclosed in the non-patent-literature of T. C. Group, "Tpm main, part 1 design principles. specification version 1.2, revision 103" 2007, which limits the rate for counter generation, and CheapBFT uses FPGA-based trusted subsystem. Furthermore, both MinBFT and CheapBFT require each (active) server to do multicast or even all-to-all broadcast, which leads to a communication/message complexity of $O(n^2)$.

In the non-patent literature of E. Syta, I. Tamas, D. Visher, D. I. Wolinsky, L. Gasser, N. Gailly, and B. Ford, "Keeping authorities "honest or bust" with decentralized witness cosigning," in 37th IEEE Symposium on Security and Privacy, 2016] a multisignature procedure is shown allowing an aggregation of messages. However a disadvantage is that the shown multisignature procedure leads to larger messages sizes and longer processing times. A further disadvantage is that replicas have to sign different messages.

SUMMARY

In an embodiment, the present invention provides a method for byzantine fault-tolerance replicating of data on a plurality of n servers. The n servers include one primary node (PN) and n−1 backup nodes (BN), wherein f servers may arbitrarily fail, and wherein all n servers have a trusted computing entity (TCE). The method includes performing, by the TCE of the PN, a preprocessing procedure. The preprocessing procedure includes the steps of computing a random secret value for a unique, monotonic, sequential counter (UMSC) to be assigned with a request message for requesting an operation to be performed, computing a commitment for the random secret value and the UMSC, and splitting the random secret value into a plurality of shares. The preprocessing procedure further includes computing a server-specific authenticated encryption of each share, such that decryption can only be performed by the specified respective server, wherein during a later procedure the server-specific shares are used for verifying the request message, and providing the computed server-specific shares and the computed commitment to the respective servers.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

At least one embodiment of the present invention provides for increasing the performance of byzantine fault-tolerance replication of data by lowering the computational resources like memory and CPU cycles while at least not significantly increasing the number and size of network packets. At least one embodiment of the present invention therefore provides for reducing the number of operations of replicas on messages like signing, etc.

In an embodiment, the present invention provides a method for byzantine fault-tolerance replicating of data on a plurality of n servers, said n servers comprising one primary node, 'PN' and n−1 backup nodes, 'BN', wherein f servers may arbitrarily fail, and wherein all n servers having a trusted computing entity, 'TCE', comprising a preprocessing procedure performed by said TCE of said PN, said procedure comprising the steps of:

Computing a random secret value for a unique, monotonic, sequential counter, 'UMSC', to be assigned with a request message for requesting an operation to be performed, Computing a commitment for said random secret value and said UMSC, Splitting said random secret value into a plurality of shares, Computing a server-specific authenticated encryption of each share, such that decryption can only be performed by said specified respective server, wherein during a later procedure the server-specific shares are used for verifying said request message.

Providing said computed server-specific shares and said computed commitment to the respective servers.

In a further embodiment the present invention provides a system for byzantine fault-tolerance replicating of data on a plurality of n servers by a client, said n servers comprising one primary node, 'PN' and n−1 backup nodes, 'BN', wherein f servers may arbitrarily fail, and wherein all n servers having a trusted computing entity, 'TCE', Said TCE of said PN being adapted to perform the steps of:

Computing a random secret value for a unique, monotonic, sequential counter, 'UMSC', to be assigned with a request message for requesting an operation to be performed, Computing a commitment for said random secret value and said UMSC, Splitting said random secret value into a plurality of shares, Computing a server-specific authenticated encryption of each share, such that decryption can only be performed by said specified respective server, wherein during a later procedure the server-specific shares are used for verifying said request message.

Providing said computed server-specific shares and said computed commitment to the respective servers.

In a further embodiment the present invention provides a non-transitory computer readable medium storing a program causing a computer to execute a method for byzantine fault-tolerance replicating of data on a plurality of n servers, said n servers comprising one primary node, 'PN' and n−1 backup nodes, 'BN', wherein f servers may arbitrarily fail, and wherein all n servers having a trusted computing entity, 'TCE', comprising a preprocessing procedure performed by said TCE of said PN, said procedure comprising the steps of:

Computing a random secret value for a unique, monotonic, sequential counter, 'UMSC', to be assigned with a request message for requesting an operation to be performed, Computing a commitment for said random secret value and said UMSC, Splitting said random secret value into a plurality of shares, Computing a server-specific authenticated encryption of each share, such that decryption can only be performed by said specified respective server, wherein during a later procedure the server-specific shares are used for verifying said request message.

Providing said computed server-specific shares and said computed commitment to the respective servers.

At least one embodiment of the present invention may have the advantage of reducing the computation time and resources of counter-based protocols using secret sharing to minimize or completely eliminate public key operations resulting in a much lower computation time and resources.

At least one embodiment of the present invention may have the advantage of aggregating messages, so that replicas do not have to perform extensive e.g. all-to-all broadcasting of messages.

At least one embodiment of the present invention may have the advantage of receiving only one message, e.g. by a client instead of f+1 messages for a request.

At least one embodiment of the present invention may have the advantage that all replicas maintain the same counter value.

| Notation | Description |
|---|---|
| Entities | |
| C | Client |
| S | Server |
| $S_p$ | Primary |
| $S_i$ | Backup |
| USIG | Unique Sequential Identifier Generator |
| Objects | |
| M | Request message |
| UI | Unique Identifier |
| N | Ephemeral nonce |
| Parameters | |
| n | Number of servers |
| f | Number of faulty servers |
| p | Primary number |
| v | View number |
| c | Counter value |
| Cryptographic Notations | |
| H( ) | Cryptographic hash function |
| h | Cryptographic hash |
| E( ) | Authenticated encryption |
| σ | Signature |

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

The terms "client", "server", "primary node", and "backup node" each refer in particular in the claims, preferably in the description each to an entity, device or computing device adapted to perform computing like a personal computer, a tablet, a mobile phone, a server, or the like and comprises one or more processors having one or more cores and may be connectable to a memory for storing an application which is adapted to perform corresponding steps of one or more of the embodiments of the present invention. Any application may be software based and/or hardware based installed in the memory on which the processor(s) can work on. The entities may be adapted in such a way that the corresponding steps to be computed are performed in an optimized way. For instance different steps may be performed in parallel with a single processor on different of its cores. Further a plurality of same or different entities may be identical forming a single computing entity. The entity or entities may also be instantiated as a virtual entity running on a single or a plurality of physical computing resources. Different entities may therefore be executed on said physical computing resource.

The term "trusted computing entity" or "TCE" refers in particular in the claims, preferably in the specification to an entity, device or computing device isolating and protecting security-critical logic from all other hardware and software running on an entity or server. A trusting computing entity provides confidentiality and integrity protection for a trusted application running within a trusted execution environment respectively on said trusting computing entity, ensuring that no application running outside said trusted execution environment can interfere with the trusted application's operation. The trusted execution environment provided or spanned by a trusted computing entity may provide some form of remote attestation allowing remote users to certain the current configuration and behavior of a trusted application. The trusted execution environment may be provided in form of a central processing unit or the like.

The term "multicasting" refers in particular in the claims, preferably in the specification to a group communication where information is addressed to a group of destination devices simultaneously. Multicast is also known as a one-to-many or many-to-many communication.

The term "unique, monotonic and sequential counter" with regard to a message refers in particular in the claims, preferably in the specification to an information, data or message to which a counter is assigned which is never the same for two different information (uniqueness), which is lower than a previous one (monotonicity) and which is not the successor of the previous one (sequentiality).

The terms "star topology", "tree topology" and "tree" respectively are to be understood in their respective broadest sense and each refer particular in the claims, preferably in the specification to a connection topology between servers which may be physically and/or virtually organized as a star or a tree respectively. In a star topology an entity or device forming the center of the star is physically and/or virtually connected directly to each of the other entities or devices in this topology. In a tree topology one of the entities or devices performing the network is a root of the tree which is connected to one or more children, wherein said children—now parents—may be again connected to one or more other children and so on.

The term "spanning tree" is to be understood in its broadest sense and refers in particular in the claims, preferably in the specification to the spanning tree protocol STP according to IEEE 802.1D.

The term "aggregated" with regard to the term "signature" or "share" refers in particular in the claims, preferably in the specification to a signature, share or secret generated by using signature parts, shares or parts of a secret, said signature parts or secret parts being generated by different entities or devices and being collected before, to compute a single aggregated signature or single aggregated secret.

The term "view" is to be understood in its broadest sense and refers in particular in the claims, preferably in the specification to a certain network configuration. For example in a view one server is the primary server PN and the other servers are backup servers. For instance PN picks the ordering for execution of operations requested by clients C. For instance it does this by assigning the next available sequence number to a request and sending this assignment to the backups. But PN may be faulty: it may assign the same sequence number to different requests, stop assigning sequence numbers, or leave gaps between sequence numbers. Therefore the backups may check the sequence numbers assigned by the PN and use timeouts to detect when it stops. They may trigger view changes to select a new PN when it appears that the current one has failed.

The term "server-specific share" or "BN-specific share" respectively is to be understood in its broadest sense and refers in particular in the claims, preferably in the specification to a share being calculated via an authenticated encryption such that it can only be decrypted by the corresponding server or node.

The term "commitment" is to be understood in its broadest sense and refers in particular in the claims, preferably in the specification to a scheme allowing one to commit to a chosen value or statement while keeping it hidden to others, with the ability to reveal the committed value or statement later.

The terms "validating" and "verifying" are to be understood in their broadest sense and refer in particular in the claims, preferably in the specification each to a procedure performing reviewing, investigating, (re)checking, controlling, confirming, (re)assuring, attesting, affirming, certifying, etc.

The term "integrity" with respect to any kind of data, information, message, share or the like is to be understood in its broadest sense and refers in particular in the claims, preferably in the specification to the completeness, intactness, inviolacy, inviolability, etc. of said data, information, message, share or the like.

The term "collecting" with respect to any kind of data, information, message, share or the like is to be understood in its broadest sense and refers in particular in the claims, preferably in the specification to fetch, receive, obtain, get, request and receive said data, information, message, share or the like.

The term "reconstructing" with respect to any kind of data, information, message, share or the like is to be understood in its broadest sense and refers in particular in the claims, preferably in the specification to rebuild, rearrange, reconfigure, reconstruct, redesign, recompute, reassemble, etc. of said data, information, message, share or the like.

The term "active" with respect to the term "server" or "BN" this to be understood in its broadest sense, and refers in particular in the claims, preferably in the specification to servers executing requests, for example client requests, etc. whereas the term "passive" with respect to the term "server" or "BN" in turn means that said passive server only modifies its state, for instance by processing state updates provided by the active servers.

The term "distance parameter" is to be understood in its broadest sense and refers in particular in the claims, preferably in the specification to parameter indicating some kind of or sort of physical or virtual space, range, separation, distance, etc. between two computing entities being defined for example by a network topology, by a network administrator, and/or by network parameters like throughput, round-trip time, round-trip delay, etc.

The term "history information" may be understood in its broadest sense and refers in particular in the claims, preferably in the specification to information which may include but is not limited to prepare messages for the prepared requests, commit messages for the committed requests, reply messages for the executed requests and requests for the request that receive no pre-pass. In other words histo the term "history information" includes all prepared, committed and executed requests.

The term "matching" is to be understood in its broadest sense and refers in particular in the claims, preferably in the specification to a comparison, replication, adjustment, balance, checking for correctness, similarity, the quality, etc.

The term "direct" with regard to the term "connection" or "connecting" is to be understood in its broadest sense and refers in particular in the claims, preferably in the specification to any kind of connection without a detour, indirection, loop way physically and/or virtually.

Further features, advantages and further embodiments are described or may become apparent in the following:

Said PN may receive a request message for requesting a certain operation and said PN may computes a prepare message including at least the content of said request message and a unique identifier, 'UI', said UI being computed by said TCE of said PN, said UI being based on a cryptographic signature of said request message and said UMSC wherein said PN may provide said prepare message to said BN. This enables to assign said UMSC to said request message in said prepare message.

At least one of the steps of
  ii. decrypting said BN-specific share by said BN and providing the decrypted share to said PN,
  iii. Collecting, by said PN, a number of shares,
  iv. Reconstructing, by said PN, the secret value based on the collected shares and/or the share of said PN,
  v. Verifying, by said PN, the reconstructed secret by using it to open said computed commitment during said preprocessing procedure, wherein said PN may perform said request when said reconstructed secret is verified,
  vi. Transmitting said opened commitment to said BN, wherein said opened commitment may be transmitted by broadcasting, and
  vii. Comparing, by each of said BN, said received transmitted opened commitment with the commitment received during said preprocessing phase
may be performed. This enables in an efficient way to verify the request message.

Prior to step ii) a step i) validating, by each of said BN, said prepare message by checking the UI by each of the TCE of the respective BN, may be performed and wherein after step vii) a step viii) performing the request of said request message by said BN upon positive result of said comparison may be performed. This enables to validate said prepare message and to perform the request.

If the number of collected shares is smaller than the number of n servers, then the integrity of each collected share may be checked by said PN prior to reconstructing said secret value, wherein said number of shares may be equal to the number of servers. This avoids a complete reconstruction of the secret with corrupt shares, thus avoiding a waste of computational resources.

For authenticated encryption a public key of each BN may be used or a pair-wise symmetric encryption between the PN and each of said BN may be used. Using symmetric key encryption enables for example to eliminate public key operations.

Said PN may perform said request when said reconstructed secret is verified. This enables to perform the request immediately when a verified secret is available.

Active BN may be detected by said PN, and wherein only said determined active BN may be used for performing at least one step of the method. This enables by a central entity to determine active BN and to perform steps of the method only with determined active BN. Thus communication time and resources are further reduced and detection of BN being active is performed by a single entity.

Said active BN may be organized by said PN into a spanning tree comprising nodes and said tree being rooted at said PN, wherein communication is performed along said spanning tree of active BN aggregating shares by intermediate nodes within said tree. This improves the scalability.

Said PN may be selected out of all servers and wherein, when said PN is determined to be faulty, new PN out of active BN is selected. This enhances the efficiency since a faulty PN is replaced by a new BN of all servers now acting as PN.

A PN may be determined faulty by said client by not receiving a reply message after expiry of a certain time after having sent said request message. This enables in an easy way to determine a PN being faulty.

Said new PN may be selected by the steps of
  a) Requesting a view change by a BN after expiry of said certain time period for waiting for a response of a PN, by sending a view change message to all other BN,
  b) Choosing a new PN as a BN being active and being closest to the old PN according to a distance parameter,
  c) Computing a history message, by said new PN, comprising information of the latest local counter value and request history information about communication performed between said new PN and said old PN and said new PN and other BN,
  d) Sending said history message to all other BN by said new PN,
  e) Computing a view change message by each of said BN, after verifying the received request history information,
  f) Providing said computed view change message to all other BN after having verified the request history information of a received history message,
  g) Upon having received f matching view change messages, by a BN, and having a verified request history, processing the verified history,
  h) Upon having received f matching view change messages by said new PN, said new PN provides view change messages to said f BN indicating that a new PN is established.

This enables in a fast and efficient way to perform a view change, i.e. to switch from a faulty PN to a new PN.

A faulty BN may be identified by the steps of
  a) Upon at least one of sending and receiving, of a message, starting a timer by a BN, associated with each directly connected BN,
  b) When not receiving a valid share from a directly connected BN before expiry of the timer for said directly connected BN, providing a suspect message at least to said PN indicating a possible failure of said directly connected BN,
  c) Upon receiving, by said PN, at least one suspect message, determining said possibly faulty BN and selecting a replacement BN for said determined faulty BN,
  d) Providing information about said replacement BN to the other BN, such that said determined faulty BN is ignored by the other BN.

This enables the fast and efficient way to detect faulty BN.

Said directly connected BN may the children of said BN and wherein said suspect message may be also provided to the parent of said BN and wherein a suspect message may be provided along the tree to said PN. This passing along the tree enables to cancel timers and to reduce the number of suspect messages, that means communication is reduced.

A view number may be included into the messages for indicating a current view determining a certain server being PN and other servers being BN. This allows an easy way with minimum of data to determine a current configuration of PN and BN.

Upon valid verification of said reconstructed secret said PN may perform the request and wherein the result of the performed request may be transmitted to said BN together with an increased counter value.

There are several ways how to design and further develop the teaching of the present invention in an advantageous way. To this end it is to be referred to the patent claims subordinate to the independent claims on the one hand and to the following explanation of further embodiments of the invention by way of example, illustrated by the figure on the other hand. In connection with the explanation of the further embodiments of the invention by the aid of the figure, generally further embodiments and further developments of the teaching will be explained.

Figure 1:
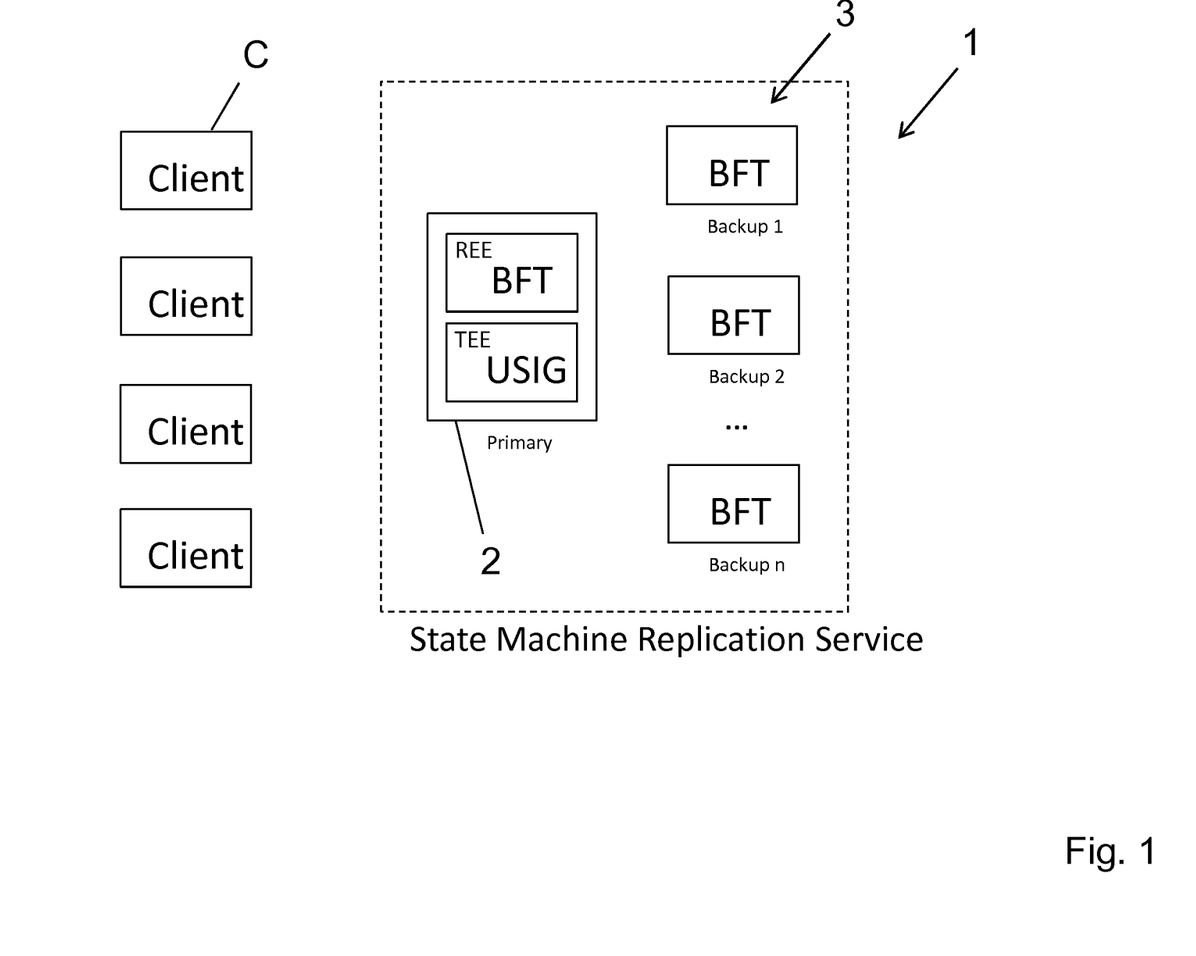
FIG. 1 shows a system according to an embodiment of the present invention.

In FIG. 1 a state machine replication service 1 is shown having a primary node 2 which includes a rich execution environment REE for performing a byzantine free tolerance application and a TEE being a trusted execution environment on which a unique sequential identifier generator USIG is run. Further backup servers 3 are shown also running a byzantine free tolerance protocol performed in the state machine replication service. A client C requests executing a certain operation and sends a request to the primary 2 and all backup servers 3 which are shown in FIG. 2 in more detail.

Figure 2:
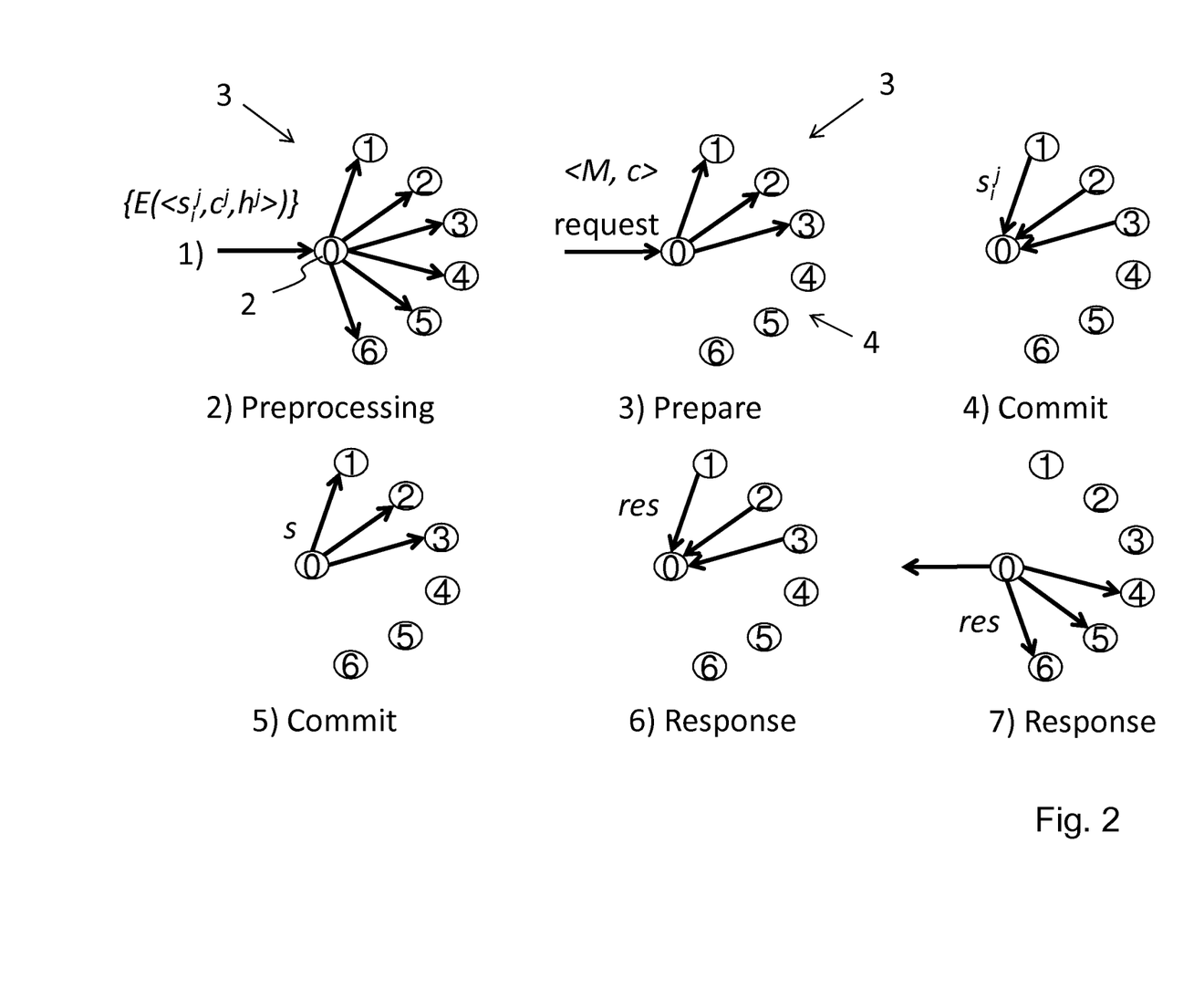
FIG. 2 shows parts of steps of a method according to an embodiment of the present invention.
Figure 3:
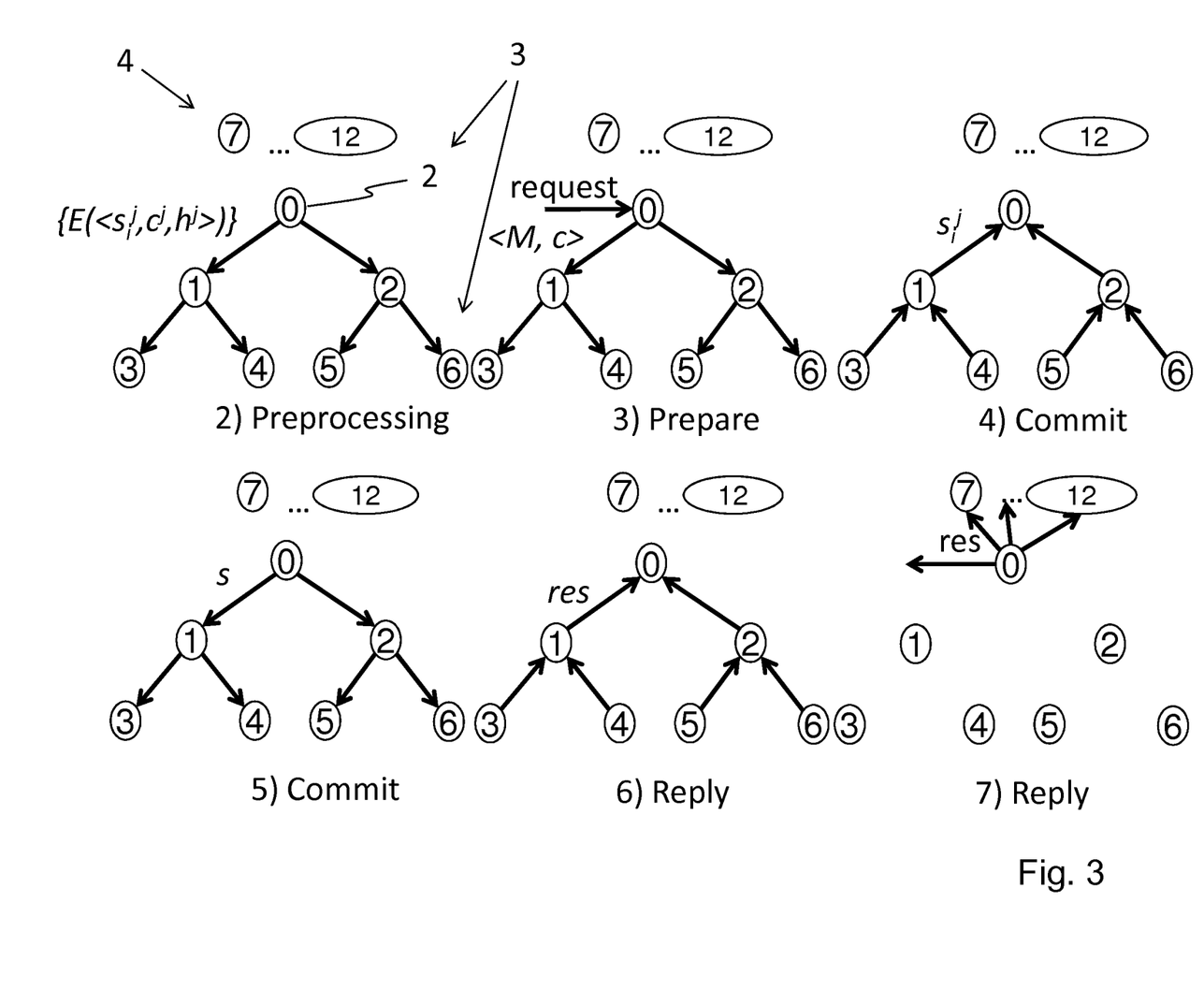
FIG. 3 shows parts of steps of a method according to a further embodiment of the present invention.

FIG. 2 shows parts of steps of a method according to an embodiment of the present invention and FIG. 3 shows parts of steps of a method according to a further embodiment of the present invention.

The term $S_p$ with reference sign 2, is interchangeably used for the primary node PN, the term $S_i$ with reference sign 3 is interchangeably used for the i-th active BN in FIGS. 2 and 3 and reference sign 4 denotes passive BN/replica.

In FIG. 2 in the first step 1) a setup procedure by the primary node PN this performed according to the following:

The $S_p$'s local TEE sets up a secret key $k_i$, with the $S_i$'s local TEE of each BN/$S_i$.

$S_p$ organizes active $S_i$s into a spanning tree.

In a second step 2) the PN $S_p$ performs a preprocessing procedure according to the following: For each counter value $c^j$, $S_p$'s local TEE does the followings:

1) generates a random secret $s^j$ and calculates $h^j \leftarrow H(s^j, c^j)$;
2) splits $s^j$ into $s^j = s_1^j \oplus \ldots \oplus s_{f+1}^j$
3) for each active $S_i$, calculates $C_i^j := E(k_i, \langle s_{i(j)}, c^j, \{\hat{h}_k^j\}, h^j \rangle)$, where E( ) is an authenticated encryption. $S_k$ is assumed to be one of $S_i$'s direct children, $\hat{h}_k^j$ is calculated as $\hat{h}_k^j = H(\oplus_{l \in \emptyset_k} s_l^j)$, where $\emptyset_k$ is the set of $S_k$'s descendants;
4) calculates $\langle h^j, c^j \rangle_{\sigma_p}$ which is a signature generated using the signing key inside TEE;
5) reveals $\langle h^j, c^j \rangle_{\sigma_p}$ and $C_i^j$ to $S_p$ In other words in the preprocessing phase, $S_p$'s local trusted hardware pre-computes message authentication codes $h^j := MAC(s^j, c^j)$ for a set of counter values $\{c^j\}$, where $s^j$ is a random secret. Then it splits $s^j$ into shares $\{s_1^j, \ldots, s_n^j\}$ and calculates $C_i^j := E(\langle s_i^j, c^j, h^j \rangle)$ for each $s_i^j$ E( ) is an authenticated encryption. In one embodiment, E( ) uses the public encryption key of each $S_i$, whose private decryption key is known only to the trusted hardware of the respective $S_i$. In a second embodiment, E( ) uses a pair-wise symmetric key previously agreed between the trusted hardware modules of $S_p$ and $S_i$. Next, it reveals $h^j$ and $\{C_i^j\}$ to $S_p$, who sends in a further step $C_i^j$ to the corresponding $S_i$.

In this embodiment an (f+1)-out-of-(f+1) secret sharing is used. Specifically, the secret $s^i$ is split as $s^i = s_1^i \oplus \ldots \oplus s_{f+1}^i$ and each replica obtains $s_j^i$, $h^i$ is calculated as $MAC(s^i, c^i)$.

In a further embodiment (f+1)-out-of-n secret sharing may be used. Specifically, $S_p$'s trusted hardware first generates n random values $x_1, \ldots, x_n$, and for each $x_i$ it computes $$y_i = \prod_{j \neq i} \frac{x_j}{x_j - x_i}.$$

Then, for each counter value $c^i$, it generates a polynomial $f^i(x) = s^i + a_1^i x^1 + \ldots + a_f^i x^f$ for sharing a secret $s^i$, and each replica obtains $f^i(x_j)$ as the share $s_j^i$ and the $S_p$ obtains $MAC(f^i(x_j))$. $h^i$ is calculated as $MAC(s^i, c^i)$ as well. To reconstruct the secret, $S_p$ first checks whether $MAC(f^i(x_j))$ is equal to the one it has received. Then it picks f+1 shares and calculates $$s^i = \Sigma_{i=1}^{f+1} f(x_i) y_i.$$

The primary node $S_p$ then sends—as shown in FIG. 2—$C_i^j$ to each active replica $S_i$. It can send these messages in batch for all counters.

After that the client C performs a request procedure according to the following:

C requests the execution of op by sending ⟨REQUEST, op⟩$_{\sigma_c}$ only to $S_p$. If C receives no reply before a timeout, it broadcasts the REQUEST to all replicas.

The PN $S_p$ then performs a prepare procedure 3) according to the following:

$S_p$ multicasts or sends along a tree ⟨PREPARE, M, v, ⟨H(M), $c^j$⟩$_{\sigma_p}$⟩ to all active $S_i$s. ⟨H(M),$c^j$⟩$_{\sigma_p}$ is returned by $S_p$'s local TEE, where $c^j$ is the current counter value.

In the prepare phase for the $j^{th}$ request, $S_p$'s trusted hardware signs a PREPARE message with the current counter value $c^j$ inside, and gives it to $S_p$, who multicasts it to all $S_i$s. In one embodiment, the signing is done by an authentic asymmetric signing key that is known only to the $S_p$'s trusted hardware. In a second embodiment, signing is done using a global symmetric key shared among the trusted hardware modules of all servers.

Then each active BN performs a commit procedure 4) and 5) according to the following:

Each active $S_i$ gives ⟨H(M),$c^j$⟩$_{\sigma_p}$ and the corresponding $C_i^j$ to its local TEE, who verifies:

the validity of $\sigma_p$;
the integrity of $C_i^j$;
whether the counter value inside $C_i^j$ is equal to $c^j$;
whether $c^j$ is sequential to the latest counter recorded by itself.

If all are valid, the respective TEE records $c^j$ as the latest counter value in its memory, decrypts $C_i^j$ and reveals the result to $S_i$.

In a tree-like organizing structure of BN $S_i$ first waits to receive a partial aggregate share $\hat{s}_k^j$ from each of its immediate children $S_k$. Then it verifies if $H(\hat{s}_k^j) = \hat{h}_k^j$. If so, it calculates its own response $\hat{s}_i^j = s_i^j \oplus_{k \in \mathcal{O}_i} \hat{s}_k^j$, and sends to its parent according to 4) step in FIG. 3.

In FIG. 2 however no aggregation has to be performed $s_i^j$ is directly sent by $S_i$ to the processing node 2.

In other words in the commit phase each replica $S_i$ gives this PREPARE message together with the corresponding $C_i^j$ to its local trusted hardware, who verifies a) the validity of the signature in the PREPARE message, b) the integrity of $C_i^j$, c) whether the counter value $c^j$ in the PREPARE message matches the one in $C_i^j$, and d) whether $c^j$ is sequential to the latest counter recorded by itself. If everything is alright, it reveals $\langle s_i^j, c^j, h^j \rangle$ to $S_i$, who then gives the share $s_i^j$ back to $S_p$. $S_p$ reconstructs the secret $s^j$ if it receives at least a threshold number of replies. If the secret is correct (the MAC of the secret and the corresponding counter value meets the previous $h^j$), it e.g. multicasts the secret to each replica BN. From each replica's point of view, the secret represents a threshold number of COMMIT messages.

So after verifying the secret, each replica BN executes the request in the PREPARE message as shown in the following: After receiving the valid aggregate shares, $S_p$ reconstructs $s^j$ and verifies it with $h^j$. If valid, $S_p$ executes op and get the result res. Then it multicasts $\langle \text{COMMIT}, s^j, \text{res}, \langle H(\text{res}), c^{j+1} \rangle_{\sigma_p} \rangle$ to all active $S_i$s, where $c^{j+1} = c^j + 1$ according to step 5) in FIG. 2. In FIG. 3 said commit message is transmitted along the tree to all active BN. Then in a further step upon receiving a valid $s^j$, each active $S_i$ executes op and get the result res. Then they perform the same procedure as the commit phase to open $s^{j+1}$ and sent the result back to the PN $S_p$ according to step 6) in FIGS. 2 and 3 either directly to $S_p$ in FIG. 2 or along the tree in FIG. 3. $S_p$ multicasts a reply message $\langle \text{REPLY}, s^j, \langle h^j, c^j \rangle_{\sigma_p}, \langle (M), c^j \rangle_{\sigma_p}, \text{res}, s^{j+1}, \langle h^{j+1}, c^{j+1} \rangle_{\sigma_p}, \langle H(\text{res}), c^{j+1} \rangle_{\sigma_p} \rangle$ to C as well as all other replicas in step 7)

To identify faulty replicas receiving and/or sending a PREPARE/COMMIT message, $S_i$ starts a timer for each of its direct children upon receiving and/or sending a PREPARE/COMMIT. If it receives a valid share from $S_k$ before the timer expires, it cancels the timer for $S_k$. Otherwise, it sends a SUSPECT message $\langle \text{SUSPECT}, S_k \rangle$ to both $S_p$ and its parent in case of a tree structure to signal the failure of $S_p$. Moreover, if $S_i$ receives a SUSPECT from its children, the message is forwarded to its parent, along the tree until reaches the root. Passing it along the tree allows us to cancel timers and reduce the number of SUSPECTs. If $S_p$ receives multiple SUSPECTs along the same path, only the one closest to the leaf is handled.

On receiving a SUSPECT message, $S_p$ sends a (NEW-TREE) message to all replicas, to replace the accused replica $S_k$ with a randomly chosen passive replica and move the accuser $S_i$ to a leaf position. From then on, $S_i$ can no longer accuse any replicas. It either follows the specification of the protocol, or chooses not to participate in the agreement, in which case it will be moved to the passive replicas, so a faulty replica cannot constantly "accuse" others. In case of a star-like structure as shown e.g. in FIG. 2 no direct connection between BN is necessary. Therefore, a faulty BN has to be only recognized by the PN such that it will be regarded then as passive BN/replica.

If a replica BN receives a valid client request but receives no response from the primary node $S_p$ after a timeout, it can suspect that the primary node $S_p$ is faulty and initialize a view-change as follows 1) The suspecting replica sends a $\langle \text{PANIC} \rangle$ message to all other replicas, who react by rebroadcasting the message to ensure that all replicas are notified.

2) The new primary $S_{p'}$ is chosen deterministically as the active replica with the lowest id apart from $S_p$. $S_{p'}$ sends $\langle \text{HISTORY}, O, \langle H(O), c \rangle_{\sigma_p} \rangle$ to all replicas, where c is a counter value following the latest counter value recorded by its local TEE, and O is the abort history that includes:
REPLYs for the executed requests;
COMMITs for the committed requests;
PREPAREs for the prepared requests;
REQUESTS for the requests that receives no PREPAREs.

3) When $S_i$ receives a HISTORY message from $S_{p'}$, it verifies the history O first, and then sends $\langle \text{VIEW-CHANGE}, H(O), \langle (H(O), c) \rangle_{\sigma_i} \rangle$. When a replica has obtained a correct history and f matching VIEW-CHANGE messages from different replicas, the history becomes stable. In this case, the replica processes the abort history, taking into account its local state. Having processed the history, all non-faulty replicas are in a consistent state and therefore able to safely switch to the new view.

4) After receiving f matching VIEW-CHANGE messages, $S_{p'}$ broadcasts $\langle \text{NEW-VIEW}, R, \langle H(R), (c+1) \rangle_{\sigma_p} \rangle$, where R is the set of f+1 new active replicas denominated by $S_{p'}$.

In a further embodiment the present invention provides a method for byzantine fault tolerance data replication comprising the steps of 1) A client triggers the system by issuing a request.
2) One node among n nodes is elected as the primary in a view. The other nodes are backup nodes.
3) During offline stage, the primary nodes' secure hardware performs the following operations:
   a. Generate a random secret value $s^j$ for a counter $c^j$ that would be assigned to a REQUEST message $m^j$ in the future.
   b. Compute the commitment of $s^j$ and $c^j$ as $h^j = \text{MAC}(s^j, c^j)$
   c. Generate n secret shares out of $s^j$ as $\{s_1^j, \ldots, s_n^j\}$
   d. Calculate the authenticated encryption of each share that can be only decrypted by the secure hardware of the corresponding node $S_i$ as $C_i^j = \langle c^j, h^j, E_{k_i}(s_i^j) \rangle$
   e. Send the encrypted share $C_i^j$ to each node $S_i$
4) During the online stage, after the primary node receives the REQUEST message, it broadcasts a PREPARE message to the backup nodes which is signed by its secure hardware along with the monotonic counter value $c^j$.
5) Each backup node verifies the PREPARE message to check the signature and if the counter $c^j$ is sequential to the last seen counter from the primary. This check is done by the backup's secure hardware.
6) If the PREPARE message is valid, the backup's secure hardware updates the recorded primary counter to $c^j$, retrieves the corresponding encrypted share $C_i^j$, decrypt it and reveals the share $s_i^j$ to the primary node.
7) The primary collects t out of n shares and reconstruct the secret $s^j$, where t≤n including the primary's own share. If t<n, the integrity of the each received share will be checked before reconstruction.
8) With the reconstructed secret $s^j$, the primary verifies if it opens the commitment $h^j$ that was generated during the offline stage. If it is correct, the primary broadcasts the opening $(s^j, c^j)$ to the backup nodes.
9) Each backup node verifies the received opening so against the commitment $h^j$ that was received during the offline stage. If the opening is correct, the backup node may accept the request message.

In a further embodiment of the present invention provides a method to aggregate commit/reply/update messages of the cheapBFT procedure so that the active replicas can get rid of the all-to-all broadcasts and the clients (as well as the passive replicas) only need to receive one instead of (f+1) REPLY (UPDATE) messages for a request. Here the primary node $S_p$ uses a trusted counter and have $S_i$s record the latest counter value in their TEEs. As a result, all replicas maintain the same counter value.

In an embodiment the present invention further enables message aggregation without using any public key operations. By using a preprocessing phase, in which $S_p$'s local TEE generates a set of random secrets, and for each secret generates a commitment (hash). Then it splits each secrets into shares and gives each share to each active $S_i$'s TEE. It also reveals the commitment to all replicas. Later in the commit phase, each active $S_i$ gets a share from its local TEE and sends it to $S_p$, which represents its COMMIT. After gathering f shares, $S_p$ reconstructs the secret and sends it to all $S_i$s, which represents f+1 COMMITs. The same applies for UPDATEs/REPLYs messages. However, since the secrets are generated in the preprocessing phase, it is impossible to bind a secret with a request. Instead, the $S_p$'s TEE binds the secret with a counter value in the preprocessing phase, and bind that counter value with a request in the prepare phase. Thus, a request is bond with a specific secret.

In an embodiment the present invention further enables to reduce the message complexity from $O(n^2)$ to $O(n)$, the primary node $S_p$ may organize the f+1 active replicas into a spanning tree rooted at itself, to distribute both communication and computation costs. The shares are sent in a bottom-up process and each intermediate node aggregates its children's shares together with its own, and finally $S_p$ only needs to receive and aggregate a small constant number of shares. This improves the scalability. This efficiently makes use of the tree structure, since all f+1 active replicas are required to commit and execute the requests. So there will be no time delay when a faulty intermediate node makes its whole subtree "faulty".

In an embodiment the present invention further enables a faulty replica being detected and replaced with a passive one according to the following: Any node can suspect its direct children and only its direct children by sending a signed suspicion message up the tree. A faulty node may be simply crash or send a wrong share. Its parent detects the crash failure by timeout and detects the Byzantine failure by verifying the share. Sp replaces the accused replica with a passive replica and puts the accuser in a leaf so that it cannot continue to accuse others. If Sp is faulty, all replicas will run a view-change operation to choose a new primary and a new set of active replicas.

The present invention, in particular some or all embodiments may be at least being based on or using at least part of MinBFT as disclosed in the non-patent literature of G. S. Veronese, M. Correia, A. N. Bessani, L. C. Lung, and P. Verissimo, "Efficient byzantine fault-tolerance," IEEE Transactions on Computers, vol. 62, no. 1, pp. 16-30, January 2013, which is herein incorporated by reference.

The present invention, in particular some or all embodiments may be at least being based on or using at least part of Cheap BFT as disclosed in the non-patent literature of R. Kapitza, J. Behl, C. Cachin, T. Distler, S. Kuhnle, S. V. Mohammadi, W. Schroder-Preikschat, and K. Stengel, "Cheapbft: Resource-efficient byzantine fault tolerance," in Proceedings of the 7$^{th}$ ACM European Conference on Computer Systems, ser. EuroSys '12. New York, N.Y., USA: ACM, 2012, pp. 295-308, which is herein incorporated by reference.

The present invention, in particular some or all embodiments may be at least being based on or using at least part of a failure detection procedure as disclosed in the non-patent literature of S. Duan, H. Meling, S. Peisert, and H. Zhang, "Bchain: Byzantine replication with high throughput and embedded reconfiguration," in Principles of Distributed Systems: 18th International Conference, OPODIS 2014, Cortina d'Ampezzo, Italy, Dec. 16-19, 2014. Proceedings, M. K. Aguilera, L. Querzoni, and M. Shapiro, Eds. Cham: Springer International Publishing, 2014, pp. 91-106, which is herein incorporated by reference.

The present invention, in particular some or all embodiments may be at least being based on or using at least part of a practical byzantine fault tolerance procedures as disclosed in the non-patent-literature of M. Castro and B. Liskov, "Practical byzantine fault tolerance," in Proceedings of the Third Symposium on Operating Systems Design and Implementation, ser. OSDI '99. Berkeley, Calif., USA: USENIX Association, 1999, pp. 173-186, available online http://dl.acm.org/citation.cfm?id=296806.296824, which is herein incorporated by reference.

Further, at least one embodiment of the present invention enables or provides:

1. Secret sharing to minimize or completely near eliminate public-key operations in a byzantine fault tolerance protocols such that competition cause is reduced while having the same communication demands.
2. Use of trusted computing technology.

In summary, at least one embodiment of the present invention enables a reduction in required servers from 3f+1 to 2f+1 and a number of communication rounds from 3 to 2. Further, at least one embodiment of the present invention does not rely on a symmetric cryptography relying on symmetric and lightweight cryptography enabling high throughput.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for byzantine fault-tolerance replicating of data on a plurality of n servers, then servers comprising one primary node (PN) and n−1 backup nodes (BN), wherein f servers may arbitrarily fail, and wherein all n servers have a trusted computing entity (TCE), the method comprising:
performing, by the TCE of the PN, a preprocessing procedure comprising:
computing a random secret value for a unique, monotonic, sequential counter (UMSC) to be assigned with a request message for requesting an operation to be performed,
computing a commitment for the random secret value and the UMSC,
splitting the random secret value into a plurality of server-specific shares,
computing an authenticated encryption of each respective server-specific share, wherein each authenticated encryption of a respective server-specific share can only be decrypted by a corresponding respective server, wherein each respective server-specific share is configured to be used for verifying the request message, and
providing each authenticated encryption of a respective server-specific share and the computed commitment to a corresponding the respective server;
collecting, by the PN, a number of server-specific shares, each collected server-specific share being decrypted by a respective BN;
reconstructing, by the PN, the random secret value based on the collected server-specific shares and/or a respective server-specific share corresponding to the PN; and
verifying, by the PN, the reconstructed secret by using the reconstructed secret to open the computed commitment,
wherein the PN is configured to perform the operation when the reconstructed secret is verified.

2. The method according to claim 1, wherein the PN receives the request message and computes a prepare message including at least content of the request message and a unique identifier (UI), the UI being computed by the TCE of the PN, the UI being based on a cryptographic signature of the request message and the UMSC, and wherein the PN provides the prepare message to the BN.

3. The method according to claim 1, further comprising at least one of the steps of:
transmitting, by broadcasting, the opened commitment to the BN, and
comparing, by each of the BN, the received transmitted opened commitment with the computed commitment provided during the preprocessing phase.

4. The method according to claim 2, further comprising validating, by each respective BN, the prepare message by checking the UI by the TCE of each respective BN, and
performing, by the BN upon a positive result of the validating, the operation.

5. The method according to claim 1, wherein if the number of collected server-specific shares is smaller than the number n, then an integrity of each collected share is checked by the PN prior to reconstructing the random secret value.

6. The method according to claim 1, wherein the computing the authenticated encryption of each respective server-specific share uses a public key of each BN or a pairwise symmetric encryption between the PN and each of the BN.

7. The method according to claim 1, wherein active BN are detected by the PN, and wherein only the active BN are used for performing at least one step of the method, and wherein the active BN may be organized by the PN into a spanning tree comprising nodes and rooted at the PN, wherein communication may be performed along the spanning tree of active BN by aggregating shares by intermediate nodes within the tree.

8. The method according to claim 7, wherein the PN is selected from the n server,
wherein, when the PN is determined to be faulty, a new PN is selected from the active BN, and
wherein the PN is determined to be faulty by a reply message not being received after expiry of a certain time period after the request message is transmitted.

9. The method according to claim 8, wherein the new PN is selected by the steps of:
a) requesting, by a BN after expiry of the certain time period, a view change by sending a view change message to all other BN,
b) choosing, as a new PN, a BN being active and closest to the old PN according to a distance parameter,
c) computing, by the new PN, a history message comprising information of the latest local counter value and requesting history information about communication performed between the new PN and the old PN and the new PN and other BN,
d) sending the history message to all other BN by the new PN,
e) computing, by each of the BN after verifying the received request history information, a view change message,
f) providing the computed view change message to all other BN after having verified the request history information of a received history message,
g) upon having received f matching view change messages, by a BN, and having a verified request history, processing the verified history, and
h) upon having received f matching view change messages by the new PN, the new PN provides view change messages to the f BN indicating that a new PN is established.

10. The method according to claim 1, wherein a faulty BN is identified by the steps of:
a) upon at least one of sending and receiving, of a message, starting a timer by a BN, associated with each directly connected BN,
b) when not receiving a valid share from a directly connected BN before expiry of the timer for the directly connected BN, providing a suspect message at least to the PN indicating a possible failure of the directly connected BN,
c) upon receiving, by the PN, at least one suspect message, determining the possibly faulty BN and selecting a replacement BN for the determined faulty BN, and
d) providing information about the replacement BN to the other BN, such that the determined faulty BN is ignored by the other BN.

11. The method according to claim 7, wherein directly connected BN are children of the PN and wherein a suspect message is provided to a parent of the PN and wherein a suspect message is provided along the tree to the PN.

12. The method according to claim 1, wherein a view number is included into messages for indicating a current view determining a certain server being PN and other servers being BN.

13. The method according to claim 1, wherein upon valid verification of the reconstructed secret the PN performs a request, and
wherein a result of the performed request is transmitted to the BN together with an increased counter value.

14. A system for byzantine fault-tolerance replicating of data on a plurality of servers by a client, the system comprising:
n servers including one primary node (PN) and n−1 backup nodes (BN), wherein f servers may arbitrarily fail, and wherein all n servers have a trusted computing entity (TCE),
wherein the TCE of the PN is adapted to perform the steps of:
computing a random secret value for a unique, monotonic, sequential counter (UMSC), to be assigned with a request message for requesting an operation to be performed,
computing a commitment for the random secret value and the UMSC,
splitting the random secret value into a plurality of server-specific shares,
computing an authenticated encryption of each respective server-specific share, wherein each authenticated encryption of a respective server-specific share can only be decrypted by a corresponding respective server, wherein each respective server-specific share is configured to be used for verifying the request message, and
providing each authenticated encryption of a respective server-specific share and the computed commitment to a corresponding respective server, and
wherein the PN is adapted to perform the steps of:
collecting a number of server-specific shares, each collected server-specific share being decrypted by a respective BN,
reconstructing the random secret value based on the collected server-specific shares and/or a respective server-specific share corresponding to the PN, and
verifying the reconstructed secret by using the reconstructed secret to open the computed commitment, and
wherein the PN is configured to perform the operation when the reconstructed secret is verified.

15. A non-transitory computer readable medium storing a program which, when executed, causes a computer to execute a method for byzantine fault-tolerance replicating of data on a plurality of n servers, then servers comprising one primary node (PN) and n−1 backup nodes (BN), wherein f servers may arbitrarily fail, and wherein all n servers having a trusted computing entity (TCE), the method comprising:
performing, by the TCE of the PN, a preprocessing procedure comprising:
computing a random secret value for a unique, monotonic, sequential counter (UMSC) to be assigned with a request message for requesting an operation to be performed,
computing a commitment for the random secret value and the UMSC,
splitting the random secret value into a plurality of server-specific shares,
computing an authenticated encryption of each respective server-specific share, wherein each authenticated encryption of a respective server-specific share can only be decrypted by a corresponding respective server, wherein each respective server-specific share is configured to be used for verifying the request message, and
providing each authenticated encryption of a respective server-specific share and the computed commitment to a corresponding respective server;
collecting, by the PN, a number of server-specific shares, each collected server-specific share being decrypted by a respective BN;
reconstructing, by the PN, the random secret value based on the collected server-specific shares and/or a respective server-specific share corresponding to the PN; and
verifying, by the PN, the reconstructed secret by using the reconstructed secret to open the computed commitment,
wherein the PN is configured to perform the operation when the reconstructed secret is verified.

* * * * *